United States Patent Office 3,378,559
Patented Apr. 16, 1968

3,378,559
HEPTACHLOROQUINOLINE
Horst Tarnow, Leverkusen, Hans Holtschmidt, Cologne-Stammheim, and Otto Bayer, Leverkusen, Germany, assignors to Farbenfabriken Bayer Aktiengesellschaft, Leverkusen, Germany, a corporation of Germany
No Drawing. Continuation of application Ser. No. 310,913, Sept. 23, 1963. This application Feb. 14, 1967, Ser. No. 616,132
Claims priority, application Germany, Oct. 20, 1962, F 38,107
1 Claim. (Cl. 260—283)

This is a continuation of copending application Ser. No. 310,913, filed Sept. 23, 1963, now abandoned.

The present invention relates to a process for the production of new halogen-substituted aromatic nitrogen containing heterocyclic compounds, at least one new ring being formed during the reaction.

It has already been proposed but is so far still unknown that it is possible by chlorinating aromatic and aliphatic N-alkyl-N-acylamines in stages at temperatures up to 250° C. to produce correspondingly highly chlorinated compounds which comprise as common feature the imide-chloride grouping $$-N=C-$$
$$\phantom{-N=}|$$
$$\phantom{-N=}Cl$$

It has now been found that halogen-substituted nitrogen containing heterocyclic compounds are obtained if aromatic compounds of the general formula $$Ar-N{\overset{X}{\underset{Y}{\diagdown}}}$$

wherein X represents a hydrocarbon radical, optionally substituted by halogen, and having at least 3 carbon atoms in a chain, Y represents a lower alkyl or acyl radical, and Ar represents an optionally substituted, aromatic radical which is not substituted in the position ortho- to the nitrogen atom, are chlorinated in stages, initially at temperatures from 20 to 60° C., all readily exchangeable hydrogen atoms being substituted by chlorine, and thereafter the chlorination is continued, possibly under the action of ultraviolet light, while raising the temperature to 200 to 250° C.

During the chlorination according to the invention, a new ring is formed and aromatized.

Simultaneously, a haloalkane is split off if a lower alkyl radical is present, and an acyl chloride is split off if an acyl radical is present in the starting compound.

It is extremely surprising that it is possible to build up new aromatic rings by the novel chlorination process. When starting from N-chlorocarbonyl-N-propyl aniline in the process according to the invention, heptachloroquinoline is obtained in accordance with the following formula:

[Reaction scheme: N-chlorocarbonyl-N-propyl aniline + Cl$_2$ → heptachloroquinoline]

The starting substances used according to the invention are characterized by the general formula $$Ar-N{\overset{X}{\underset{Y}{\diagdown}}}$$

In this formula X represents preferably alkyl or alkenyl radicals with 3 to 5 carbon atoms, which optionally can also be substituted by halogen, preferably chlorine, X thus represents, for example, the propyl, isobutyl, n-pentyl or 2-chlorobutyl radicals; Y preferably represents a lower alkyl radical with 1 to 3 carbon atoms, or an acyl radical, such as the acetyl radical or the chloroformic acid radical; Ar in the above formula preferably represents a phenyl or naphthyl radical. These aromatic radicals can be substituted preferably by lower alkyl radicals such as methyl and ethyl, by the nitro group, by halogen, advantageously by chlorine or bromine, by the nitrile group and also by the group $$-N{\overset{X}{\underset{Y}{\diagdown}}}$$

in which X and Y have the same meaning as in the formula indicated above. If the starting compound contains two of these groups, then two new aromatic rings are formed by the chlorination according to the invention.

These substituents can be contained once or several times in the aromatic radical.

The following are particularly suitable starting substances for the process according to the invention:

[Structural formulas of starting compounds]

(Z here represents —CH$_3$ or another lower alkyl radical, —NO$_2$, —Cl, —CN or —Br, etc. and $n$ represents an integer from 1 to 4)

[Additional structural formulas of starting compounds]

It is not absolutely necessary to use solvents in the process according to the invention.

When chlorinating high-melting substances (for example, melting point above 140° C.), it is however expedient to add inert solvents. For this purpose, it is possible to use any inert solvents which are substantially resistant to chlorination. These include, more especially, chlorinated hydrocarbons such as trichlorobenzene, pentachloroethane, hexachloroethane or acetylene tetrachloride, chloroform. The solutions used may contain 5 to 70% of the material to be chlorinated.

The reaction according to the invention can, for example, be carried out by passing chlorine into the starting substance which may be dissolved in a diluent. A chlorination, such as is generally known, occurs in this first stage. Thereafter, the chlorination temperature is gradually raised to 200–250° C., either halo-alkane or acyl-chloride, being split off at a temperature from 150 to 180° C.

This second chlorination stage is also in principle carried out in the usual way. It is possible to work under the action of ultraviolet light. If it is desired to bring about the greatest possible degree of chlorination, it is expedient to work in the presence of the usual halogen transfer agents, more especially aluminium chloride, aluminium bromide, iron chloride, stannic chloride, boron trifluoride or titanium tetrachloride. The process according to the invention has several advantages. Simple starting materials are used, the process takes place under simple conditions and leads, with formation of new aromatic rings, to hitherto still unknown substances.

The new compounds obtainable according to the invention are valuable intermediates for the production of pest-control agents, dyestuffs and plastics.

They have both herbicidal and insecticidal properties and accordingly they can also be directly employed. The highly chlorinated compounds have a particularly strong action against insects such as flies, ticks and cockroaches. A representative example of such a use is contained in the following example; the production of heptachloroquinoline.

Example 1

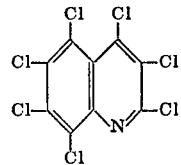

135 parts by weight of N-propyl aniline are phosgenated in 300 parts by weight of chlorobenzene at 10–120° C. After removing the solvent, the N-chloro-carbonyl-N-propyl aniline which is formed is dissolved in 200 parts by weight of chloroform and, without exposure to light, is chlorinated at 50–60° C. until no further exothermic reaction takes place. Chlorination is then continued with exposure to ultraviolet light and the temperature is raised at a rate of 5–10° C. per hour. The chloroform is gradually driven off by the strong stream of chlorine and correspondingly replaced by 250 parts by weight of trichlorobenzene. After reaching 200–220° C., chlorination is continued for a further 5 hours at this temperature. The solvent is distilled off in vacuo and 2–3% by weight of $FeCl_3$ are added to the still liquid residue, whereafter it is strongly chlorinated for 8 hours at 200° C. without ultraviolet light.

The heptachloroquinoline formed is extracted from the reaction mixture with hot cleaning benzine to give a solution which provides light-colored crystals, MP. 150–152° C., on concentration.

Analysis.—$C_9NCl_7$. Calculated: C, 29.15; N, 3.78; Cl, 67.07. Found: C, 29.64; N, 3.90; Cl, 67.10.

The heptachloroquinoline has a strong insecticidal action. Aqueous emulsions of different concentrations of heptachloroquinoline are prepared by dissolving it in dimethylformamide and diluting the solution with water and a non-ionic emulsifier to the required concentration. Even in a concentration of 0.01%, such emulsions destroy 100% flies, gnats and cockroaches.

Example 2

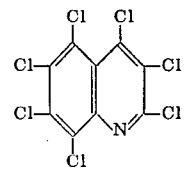

149 parts by weight of N-isobutyl aniline are phosgenated and chlorinated as described in Example 1. The product obtained is identical with the heptachloro quinoline of Example 1 and has the same melting point, mixed melting point and infra-red spectrum.

We claim:
1. Heptachloroquinoline.

References Cited

UNITED STATES PATENTS

| | | | |
|---|---|---|---|
| 2,886,568 | 5/1959 | Stansbury et al. | 260—283 |
| 3,232,946 | 2/1966 | Hazeldine et al. | 260—283 X |
| 3,251,760 | 5/1966 | Holtschmidt et al. | 260—248 |

ALEX MAZEL, *Primary Examiner.*

D. DAUS, *Assistant Examiner.*